July 26, 1955                J. D. THOMAS ET AL                2,713,736
            REMOTE CONTROL MECHANISMS FOR GATES AND THE LIKE
Filed Jan. 29, 1954                                    4 Sheets-Sheet 1
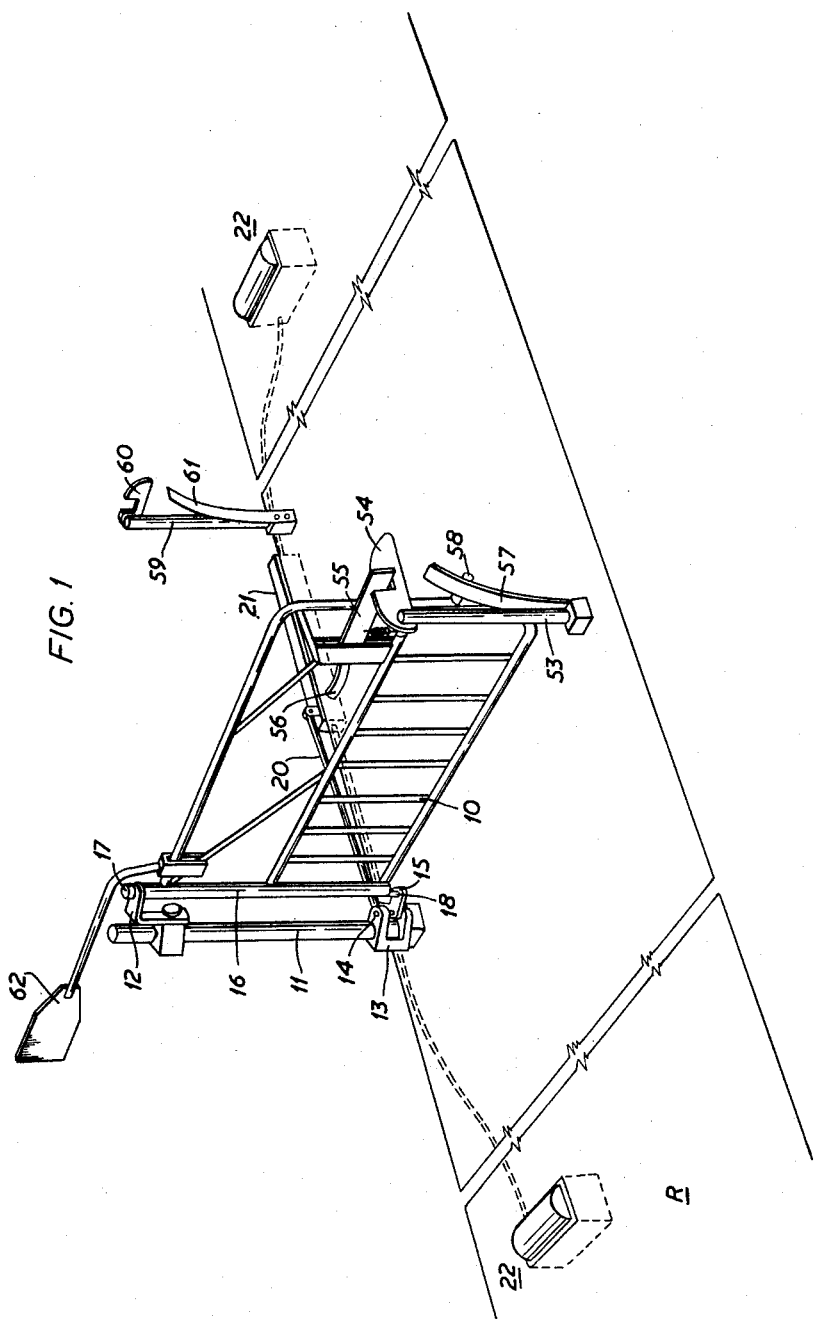
Inventor
JOHN D. THOMAS & JAMES ROBERTS
By July 26, 1955    J. D. THOMAS ET AL    2,713,736
REMOTE CONTROL MECHANISMS FOR GATES AND THE LIKE
Filed Jan. 29, 1954    4 Sheets-Sheet 2
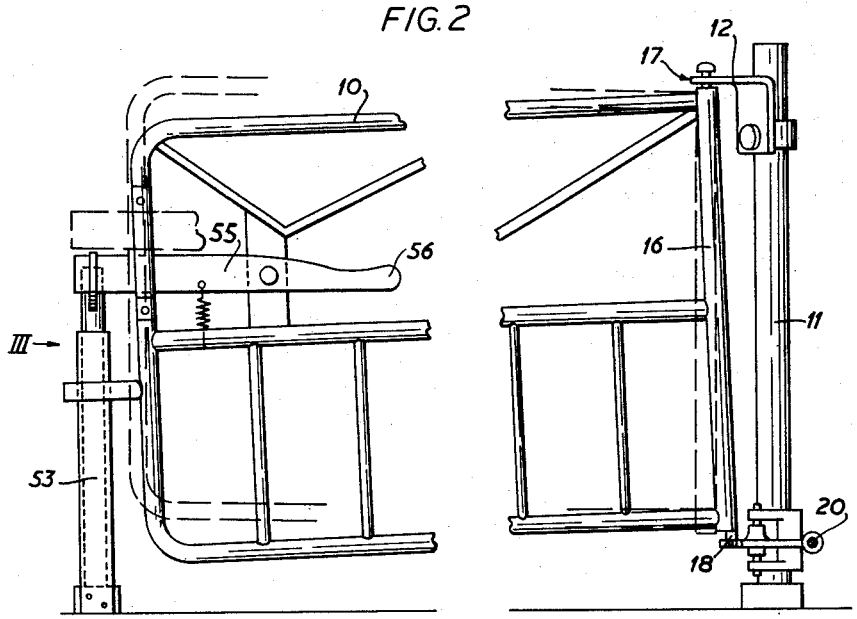
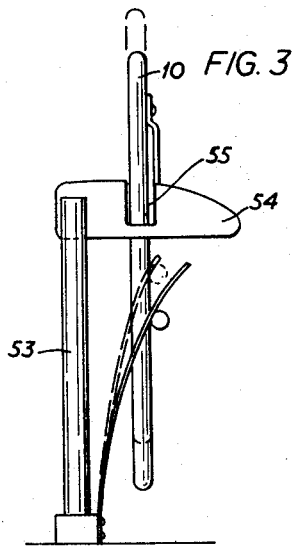
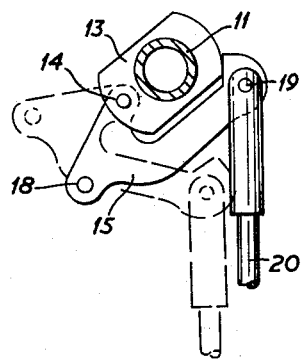
Inventor
John D. Thomas & James Roberts
By

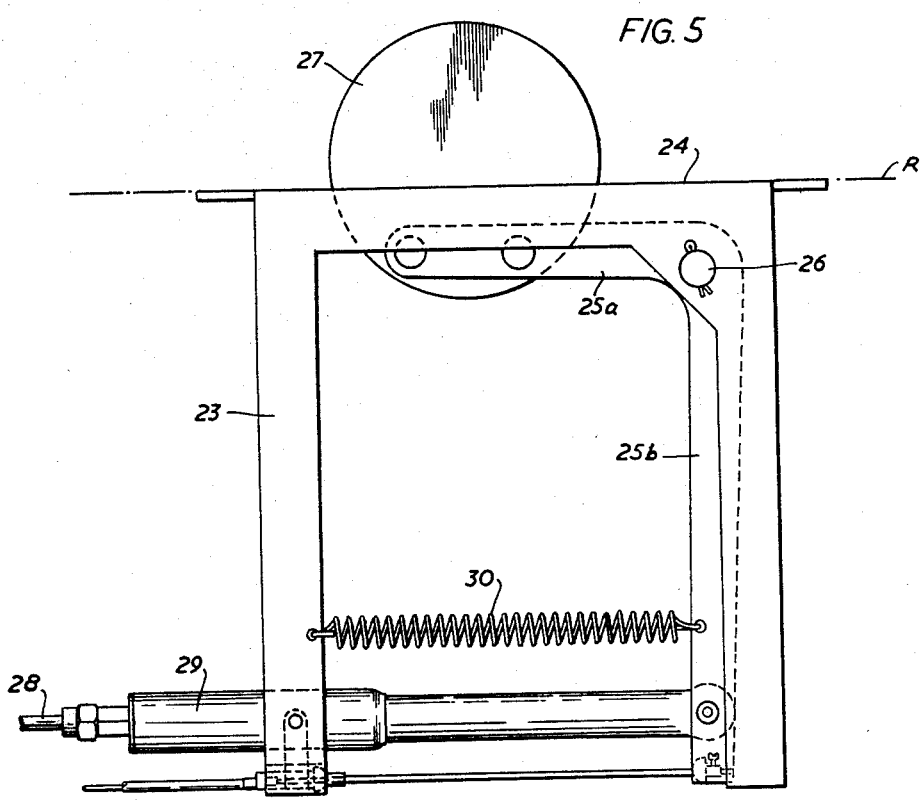

July 26, 1955         J. D. THOMAS ET AL         2,713,736
          REMOTE CONTROL MECHANISMS FOR GATES AND THE LIKE
Filed Jan. 29, 1954                          4 Sheets-Sheet 4
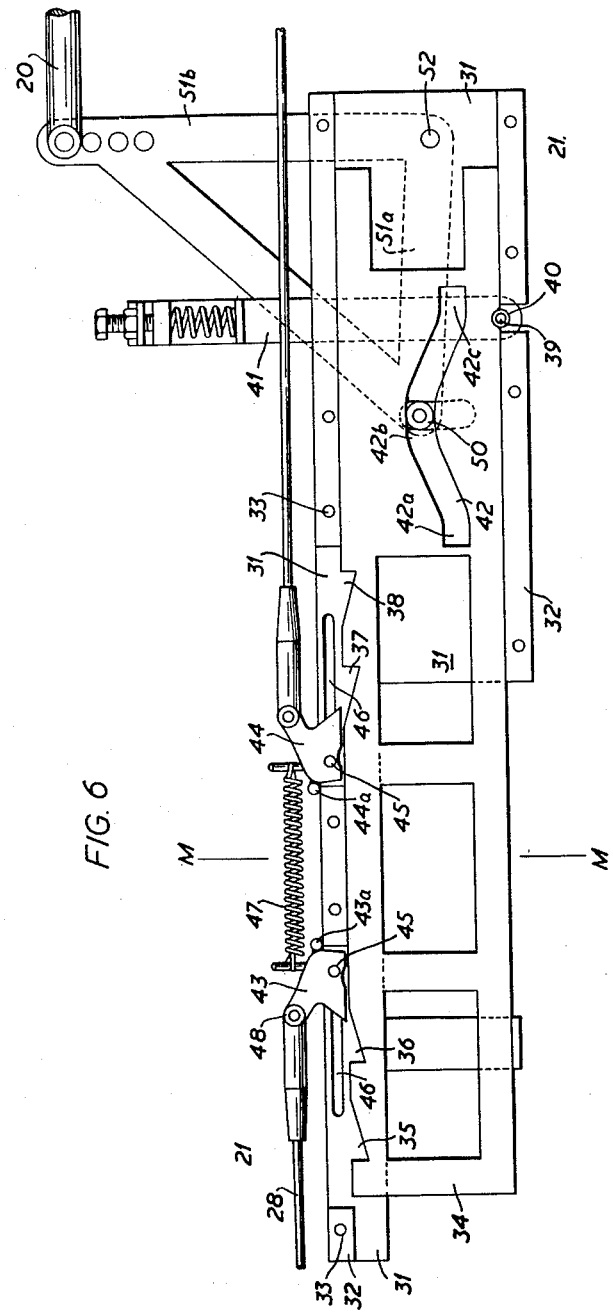
Inventor
JOHN D. THOMAS & JAMES ROBERTS
By United States Patent Office
2,713,736
Patented July 26, 1955

2,713,736

REMOTE CONTROL MECHANISMS FOR GATES AND THE LIKE

John D. Thomas, Oswestry, England, and James Roberts, Penmaenmawr, North Wales, assignors to Edward Thomas & Company (Oswestry) Limited, Oswestry, England, a British company Application January 29, 1954, Serial No. 407,126

8 Claims. (Cl. 39—9)

This invention is for improvements in or relating to remote control mechanisms. The remote control mechanism according to the invention has various applications but one particular application is to the remote operation, i. e. opening and closing, of a gate (e. g. a farm gate) by the passage of a vehicle up to, through, and beyond the gate from either direction.

According to the present invention there is provided in or for use in a remote control a selector mechanism adapted to be operated in opposite directions by two remotely located operating members, comprising a slidable member and oppositely acting pawl and tooth or notch mechanism arranged for the transmission of movement of the remotely located members to the slidable member, the arrangement of the notches or teeth and pawls being such that in the neutral position of the slidable member there are notches and pawls in operative position for movement of the slidable member in either direction and after said slidable member has been so moved there is a notch and pawl in operative position for movement of the slidable member in the reverse direction.

According to a further feature of the present invention there is provided in or for use in a remote control a selector mechanism adapted to be operated in opposite directions by remotely located operating members, comprising a slidable member having four notches or teeth spaced lengthwise of said member and a pair of oppositely acting pawls slidable in opposite directions, one of said pawls being operatively connected to, or adapted for operative connection to, one of the remotely located operating members and the other pawl being operatively connected to, or adapted for operative connection to, the other of said members, the pawls in one position of the slidable member being adapted to engage the innermost pair of said notches or teeth and in the other position of said slidable member one pawl being adapted to engage one outer notch or tooth.

In applying the invention to an automatically opening and closing gate the latter has one of the ends of its pivotal axis journalled in a pivoted lever so that said axis can be tilted to one or other side of the vertical to bias the gate towards the open or closed position, said pivoted lever being operatively connected to the slidable member of the remote control mechanism so as to be operated by the remotely located members. The latter are located in a roadway or the like in the path of movement of a vehicle therealong so as to be operated by the pressure of said vehicle.

In preferred embodiments of the invention the slidable member has a cam slot which moves a follower on a pivoted arm or lever the latter being connected to, for example, a pivoted lever for tilting the pivotal axis of a gate or to a semaphore signal.

One embodiment of the invention will now be described, by way of example, with reference to the accompanying drawing which shows the invention applied to the automatic opening and closing of a gate by the passage of a vehicle up to, through, and beyond the gate. On the drawings:

Figure 1 is a perspective view drawn to a reduced scale of the complete gate structure and a portion of the road which it is adapted to close, Figure 2 is a front elevation of the gate, Figure 3 is an end elevation of the gate viewed in the direction of the arrow III of Figure 2, Figure 4 is an enlarged detail cross-sectional view through the lower part of the gate supporting post, Figure 5 is an enlarged detail side elevation of one of the remotely located devices set in the road for the operation of the gate through the remote control mechanism, and Figure 6 is an enlarged detail side elevation of the selector mechanism, of the remote control, with one of its cheek or side plates removed to show the interior constructions.

Referring first to Figures 1 to 5 inclusive of the drawings, 10 indicates the gate and 11 the gatepost by which the gate is hingedly supported. For this purpose an upper bracket 12 is secured to the upper part of the gatepost and a bearing block 13 is secured to the lower part thereof. Pivotally mounted at 14 in the bearing block 13 is a lever 15. The upper part of the end vertical rail 16 of the gate is loosely pivoted, as indicated at 17, in the bracket 12 whilst the lower end of the rail 16 is pivoted at 18 in the lever 15. Coupled to the lever 15 as indicated at 19 is a connecting rod 20 which is operatively connected to the selector mechanism, of the remote control, indicated generally at 21 and hereinafter to be described in detail.

The depressible devices which are set in the road on opposite sides of the gate for the remote operation thereof are indicated generally at 22 and each comprises (see Figure 5) a stool or frame 23 adapted to be sunk in the road with its upper part 24 flush with the road surface R. The frame or stool 23 pivotally supports a pair of bellcrank levers 25a, 25b, the pivot for said levers being indicated at 26. A cylindrical member 27 is rigidly secured between the arms 25a of the bellcrank levers so that it will protrude some distance above the surface R of the road and be depressed by the passage of a vehicle wheel over it. The arrangement is such that the main weight of the vehicle is borne by the stool or frame 23. The arm 25b of one of the bellcrank levers is operatively connected to one end of a Bowden wire mechanism 28 whilst the corresponding arm 25b of the other bellcrank lever is connected to the piston of a hydraulic dashpot device 29 which retards return movement of the cylindrical member 27, after it has been depressed, under the action of a spring 30 anchored between the arm 25b of one of the bellcrank levers and the stool. The end of the Bowden wire mechanism remote from the depressible device just described is operatively connected to the selector mechanism 21 of the remote control.

The selector mechanism (see Figure 6) is adapted to be sunk in the roadside e. g. adjacent to the pivotal supporting means of the gate. This mechanism comprises a pair of cheek plates 31 (only one of which is shown in Figure 6, the other having been removed) spaced apart by spacing strips 32 and secured together by bolts or screws passing through holes 33. Slidably supported between the cheek plates 31 is a slidable member or plate 34. This slidable member has four longitudinally spaced notches, 35, 36, 37 and 38 along its upper edge. These notches are located symmetrically two on one side and two on the other side of a neutral or medial position indicated by the line M—M. The notches are of triangular form and the pairs 35, 36 and 37, 38 respectively located on each side of the medial position M—M have vertical edges the surfaces of which face inwardly towards said medial line, i. e. the pairs of notches face in opposite directions. There is also a notch 39 in the lower edges of the slidable member for engagement by a roller 40 on the lower end of a spring-loaded member 41. This spring-loaded device serves to locate the slidable member in the medial or neutral position as shown in Figure 6. Located in the end of the slidable member remote from that having the notches 35, 36, 37 and 38 is a cam slot 42 of splayed inverted V-form with horizontal portions 42a, 42b and 42c. These horizontal portions or landings serve positively to locate and hold the gate making the action non-reversible and to support the weight of the gate in either the closed or open position until the next operation of the remote control mechanism.

Located between the cheek plates 31 so as to engage the upper edge of the slidable plate 34 are oppositely disposed and oppositely acting pawls 43 and 44. Each pawl is mounted on a pin 45 pivotally and slidably supported in a longitudinally extending slot 46 in the cheek plates 31. A tension spring 47 connects the two pawls together and acts normally to hold them out of engagement with the notches 35, 36, 37 and 38. Movement of the pawls under the action of the spring 47 is limited by bosses or studs 43a and 44a which abut against the upper edges of the cheek plates 31. Each pawl has an arm 48 which is connected to the end of the Bowden wire mechanism, remote from the depressible device, associated with said pawl.

Registering and downwardly extending slightly arcuate solts 49 are provided in the cheek plates 31 and a pin 50 carrying a roller extends through the cheek plates from one of the said slots to the other via the cam slot 42 in the slidable member 34, the roller on the pin 50 working as a follower in said cam slot. The pin 50 has its ends secured in the arms 51a of a pair of bellcrank levers (one only of said levers being shown in Figure 6) said levers being located on opposite sides of the cheek plates 31 and pivotally connected thereto as indicated at 52. The other arms 51b of the bellcrank levers are operatively connected to the rod 20 and thereby to the lever 15 of the tiltable pivoting or hinging means of the gate.

The gate and associated apparatus above described operates as follows:

When a vehicle approaches the gate, assumed for the purpose of this description to be closed, a wheel of the vehicle will depress one or other of the devices 22 according to the direction in which the vehicle is approaching the gate, depression of a member 22 acts through its associated Bowden wire mechanism 28 on the pawl 43 or 44, as the case may be, connected thereto. The pull on the Bowden wire mechanism first causes the pawl to move downwardly into engagement with an inner notch (36 or 37) in the slidable plate 34 and then effects longitudinal sliding movement of the plate. This movement of the plate 34, through the pin 50 and cam slot 42, causes pivoting movement of the selector bellcrank levers 51a, 51b and the latter through the connecting rod 20 angle the lever 15 and tilt the pivoting means for the gate i. e. the lower pivot 18 is moved out of vertical alignment with the upper pivot 17. As a result the gate swings to the open position. The depressed cylindrical member 27 now returns slowly to its normal position, above the road surface, as does the pawl the movement of both being retarded by the dashpot device 29. Having passed through the gate the vehicle then passes over and depresses the cylinder 27 of the depressible member on that side of the gate. Depression of this cylinder through its associated Bowden wire mechanism acts on the pawl 43, 44, as the case may be, and first brings it into engagement with an outer notch (35 or 38) according to the direction in which the slidable member 34 has previously been moved, and then slides the slidable member back in a direction opposed to its original displacement so that the notches again take up a symmetrical position with respect to the medial or neutral line M—M. The pawl slides back in its slot in unison with the rise of the depressed cylinder 27. This return movement of the slidable plate, through the inverted V cam-slot and pin arrangement 42, 50, acts on the bellcrank levers 51a, 51b which in turn, through the connecting rod 20, tilt the pivoting means of the gate so that the latter now swings back to the closed position. It will be noted that with the construction described the medial or neutral position in which the pairs of pawls 35, 36 and 37, 38 are symmetrically located on either side of the line M—M corresponds to the closed position of the gate.

An identical sequence of operations takes place, of course, whatever the direction from which a vehicle approaches and passes through the gate except that the initial movement of the plate 34 is in an opposite direction.

Opposite the hinging gatepost 11 there may be provided (as shown in Figure 1) a gatepost 53 on which is mounted a catch 54 adapted to engage and interlock with a latch 55 pivoted to the gate and adapted to be operated by a handle 56 when it is desired to open the gate in the normal way by hand. During automatic opening of the gate as above described the pivot 16, in being tilted from one side to the other side of the vertical axis, passes, of course, through a vertical position and in this position the gate is raised sufficiently to enable the latch 55 to free itself from the catch 54. Also secured to the lower part of the post 53 there may be a curved or inclined leaf spring 57 which is flexed back when the gate is raised, as just described, by an abutment 58 on the latter. When the latch 55 frees itself from the catch 54 the spring 57 reacts to give an impetus to the gate in the opening direction.

Mounted on the side of the road to which the gate swings when it is opened there may be a stop post 59 having a catch 60 which temporarily retains the latch 55. This stop post may also be provided with a leaf spring 61 similar to the leaf spring 57 which serves to give an impetus to the gate in the closing direction immediately the gate has been raised sufficiently for the latch to free itself from the catch 60.

To compensate for a heavy wind blowing against the gate and tending to prevent it opening and closing a windvane 62 may be attached to the gate as shown in Figure 1.

Whilst the invention has been described more particularly as applied to the operation of a gate it has of course other applications where alternate movements of a member in opposite directions from two remotely located points can usefully be employed. In this connection it is also pointed out that, due to the construction of the selector mechanism, movement of the slidable member in one direction renders inoperative the remote control member effecting that movement until the slidable member has been returned to its normal or central position.

Whilst particular reference has been made to a Bowden wire mechanism other means, e. g. a hydraulic, pneumatic or electro-magnetic system, may be used for operatively connecting the depressible devices to the selector mechanism.

The example of the invention described above, with reference to the drawings, may be modified by providing two notches or teeth in the slidable member and four pawls. Furthermore the pawls may be on the slidable member and the notches or teeth in members connected to the Bowden wire mechanism or the like.

We claim:

1. A remote control selector mechanism comprising two operating members, a selector member located at a distance remote from the operating members and slidable to either side of a neutral position, a pair of oppositely acting pawl and notch mechanisms, means connecting one such operating member respectively with one such pawl and notch mechanism, means operatively supporting said mechanisms in relation to the slidable member so as to move said slidable member to either side of the neutral position and after such movement in one direction to bring one pawl and notch mechanism in operative position to move the slidable member in the reverse direction, and a member movable in opposing directions operatively connected with said slidable member for movement thereby.

2. A remote control selector mechanism comprising two operating members, a selector member, having four notches spaced lengthwise thereof, located at a distance remote from the operating members and slidable to either side of a neutral position, a pair of oppositely acting pawls, one each operatively connected respectively to one remote operating member, means supporting the pawls in relation to the slidable member operatively to engage either one of the inner notches when the slidable member is in the neutral position and after movement of the slidable member to enable one pawl to engage one outer notch, and a pivotally mounted lever engageable with the slidable member for movement thereby.

3. A remote control selector mechanism comprising two operating members, a selector member having four notches spaced lengthwise and towards one end thereof, said selector member being located at a distance remote from the operating members and slidable to either side of a neutral position, a cam slot in said slidable member at the end remote from the notches, a pair of oppositely acting pawls one each connected respectively to one remote operating member, means supporting the pawls in relation to the slidable member operatively to engage either one of the inner notches when the slidable member is in the neutral position and after movement of the slidable member to enable one pawl to engage one outer notch, a pivotally mounted lever and a follower on said lever engageable in the cam slot of the slidable member for movement of the lever with the slidable member.

4. A remote control selector mechanism comprising two operating members, a plate located at a distance remote from the operating members and supported between a pair of cheek plates, said plate having four notches along one edge at one end thereof and slidable between the cheek plates to either side of a neutral position, a cam slot in the slidable plate at the end remote from the four notches, a pair of oppositely acting pawls mounted on the cheek plates and spring-urged out of engagement with the notches and one each operatively connected to one operating member such that operation thereof first angles one such pawl into engagement with an inner notch of the slidable member and then moves said member bringing a pawl into operative position for engagement with an outer notch, a lever pivotally mounted on said cheek plates, a follower on said lever and engageable in a cam solt of the slidable plate whereby said lever is moved with the slidable member.

5. A remote control selector mechanism as claimed in claim 4 and further comprising a spring-loaded member operatively supported on the cheek plates to engage in a further notch in the slidable member so as to locate the latter in its neutral position.

6. An automatically opening and closing gate wherein the gate is adapted to lie across a path, said gate having a pivotal axis tiltable to either side of the vertical, two operating members disposed in the path one each on either side of the gate, a control member remote from the operating members and slidable to either side of a neutral position, a pair of oppositely acting pawl and notch mechanisms, means connecting one such operating member with one such pawl and notch mechanism, means operatively supporting said mechanisms in relation to the slidable member so as to move said slidable member to either side of its neutral position and after said movement in one direction to bring one pawl and notch mechanism in operative position to move the slidable member in the reverse direction, a member movable in opposing directions operatively connected with said slidable member for movement thereby and with the lower part of the pivotal axis of the gate.

7. An automatically opening and closing gate wherein the gate is adapted to lie across a path, said gate having a pivotal axis journalled in a pivoting lever, two depressible members disposed in the path one each on either side of the gate, a slidable plate remote from the depressible members and supported between cheek plates, said slidable plate having four notches along one edge at one end thereof and a cam slot at the other end, a pair of oppositely acting pawls supported by the cheek plates and spring-urged out of engagement with the notches, a Bowden wire mechanism operatively connecting each depressible member respectively with each pawl such that operation of a depressible member first angles either pawl into engagement with an inner notch in the slidable member and then moves said slidable member thereafter bringing a pawl into operative position for engagement with an outer notch, a lever pivotally mounted on the cheek plates, a follower on said lever and engageable in the cam slot of the slidable member and movable therewith, a rod connecting the end of the lever remote from the follower with the pivoting lever in which the pivotal axis of the gate is journalled.

8. An automatically opening and closing gate in accordance with claim 7 and further comprising a spring-loaded member adapted to engage in a further notch in the slidable member so as to locate the latter in its neutral position.

References Cited in the file of this patent

UNITED STATES PATENTS

| 249,776 | Kurtz | Nov. 22, 1881 |
| 1,717,473 | Stewart | June 18, 1929 |
| 2,062,738 | Bigler | Dec. 1, 1936 |
| 2,086,061 | Barr | July 6, 1937 |
| 2,523,616 | Fox | Sept. 26, 1950 |